Feb. 3, 1931.　　　J. C. DALLAS ET AL　　　1,790,975
METHOD AND PLANT FOR TREATING SEWAGE
BY THE ACTIVATED SLUDGE PROCESS
Filed Sept. 14, 1928　　2 Sheets-Sheet 1
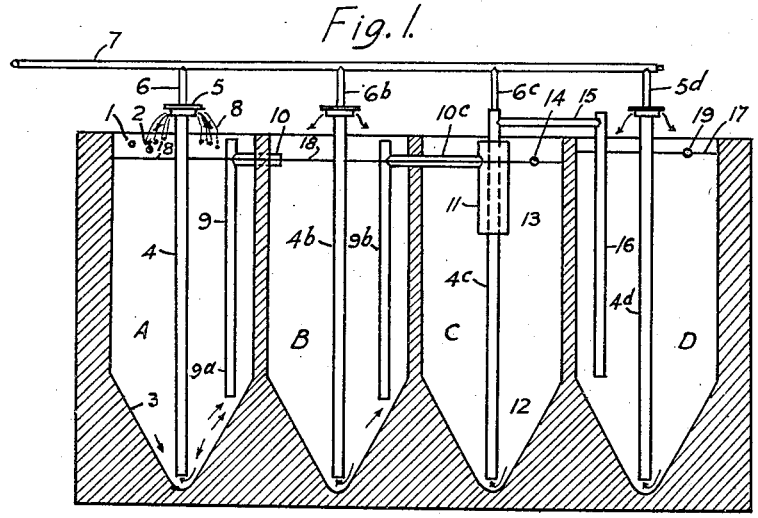
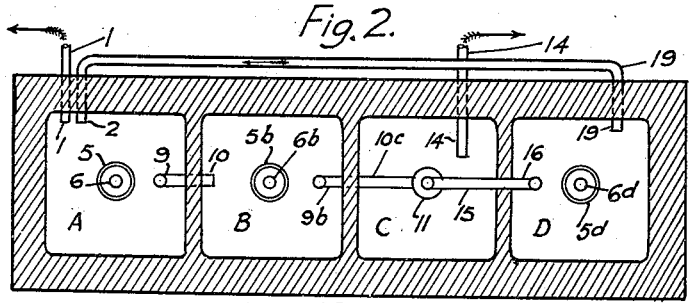
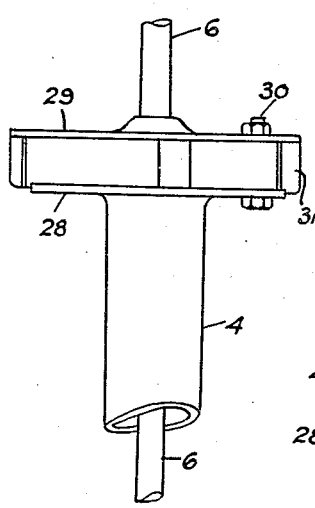
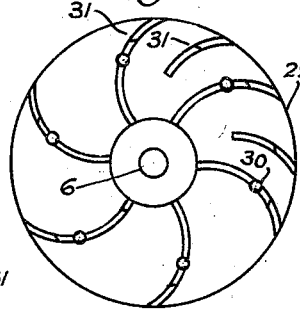
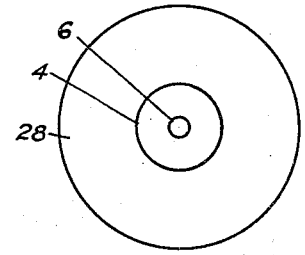
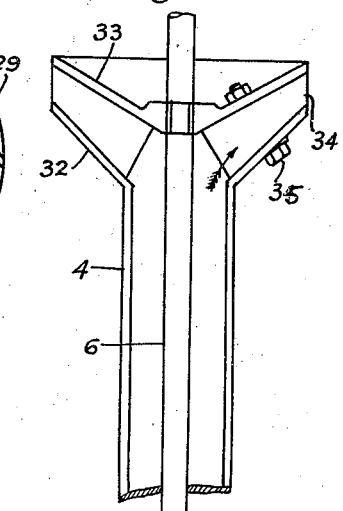
Inventors
J.C. Dallas and M. Wilson
by Jno Ennis Atty.

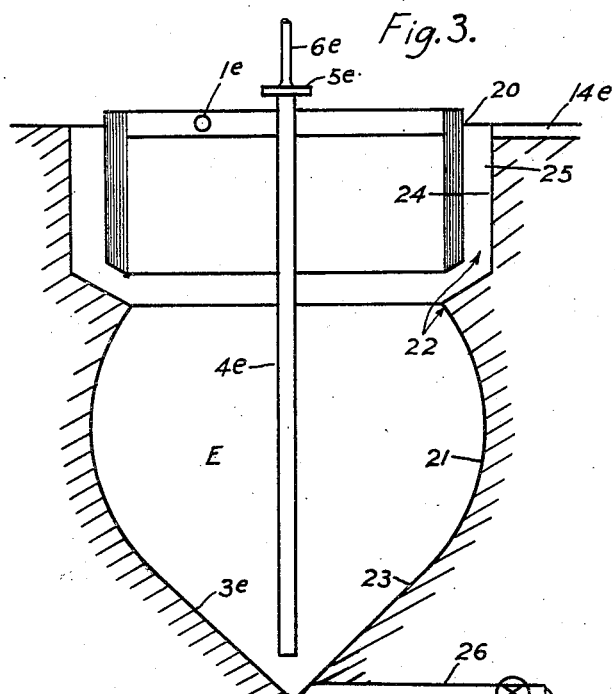
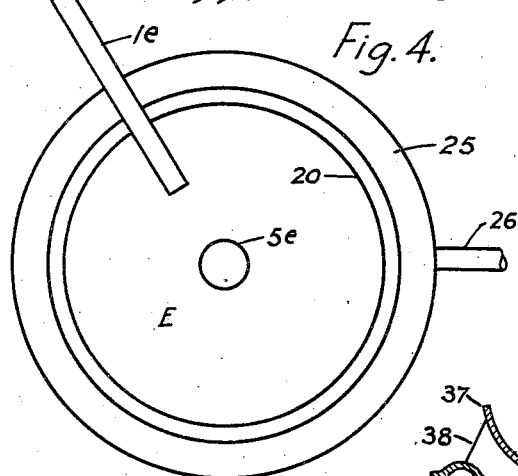
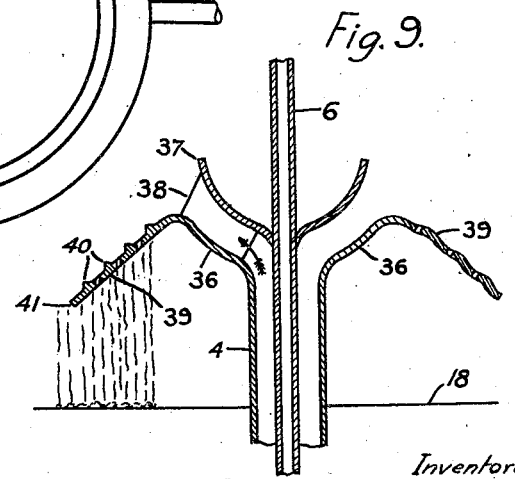

Patented Feb. 3, 1931

1,790,975

UNITED STATES PATENT OFFICE

JOHN COLLINS DALLAS AND MALCOLM WILSON, OF CALCUTTA, BRITISH INDIA

METHOD AND PLANT FOR TREATING SEWAGE BY THE ACTIVATED SLUDGE PROCESS

Application filed September 14, 1928, Serial No. 306,049, and in British India July 11, 1928.

This invention relates to the treatment of sewage, or suitable trade wastes by the aerobic activated sludge process and has for its object improvements in the method of treatment and in plant therefor which will lead, it is believed, to a more rapid and more perfect aeration and activation of the sludge and a better treatment of the raw or partly treated sewage therewith than has heretofore been possible.

The invention depends upon the application of the air lift for circulating liquid in the chambers containing the sludge and the sewage and sludge. It has been found by the applicants that the air lift not only is a very efficient means for circulating liquids in these processes but that it also produces a very rapid and effective aeration of the sludge and sewage. This is more particularly the case when the air lift is used to raise the liquid well above the surface of the liquid and to distribute it from a distributor head as a shower or spray over the surface. In such circumstance the sludge or sewage is rapidly activated and aerated and receives oxygen in the up-lift tube of the air lift where the violent disturbance and agitation caused by the air causes a very excellent and perfect mixing of the activated sludge with the sewage and causes the bacteria in the sludge greedily to attack the organic matter in the sewage. There is a further aeration and oxidation as the mixed sludge and sewage is showered out and falls as drops or as spray through the air, and finally the shower breaks up the surface of the liquid and assists in the rapid aeration of the same.

The flow downwards of the liquid in the chamber is thus continuous and most efficient and the aeration, oxidation and treatment is most rapid. Considerable and unlooked for improvement has been found to be effected if the shape of the chamber is so modified that the inner surfaces of the upper walls, instead of being vertical above the sloping bottom portions, are made hollow or concave. In some peculiar way this effects the rapidity of the process, and the improvement may perhaps be accounted for by the better flow coefficient in a chamber leading to a better circulation and a more continuous and uninterrupted aeration.

The invention comprises in the activated sludge method of treating sewage a manner of aerating the aerobic sludge to increase its activity, which consists in utilizing air lifts to cause a circulation of the sludge and/or sewage mixed therewith, in which air lift an intensive aeration and oxidation is produced by the air in turbulent admixture with the liquid.

It also includes a manner of aerating the sludge and treating the sewage, which consists in circulating the raw or partly treated sewage admixed with activated aerobic sludge in tanks, receptacles or the like in which the mixture is circulated by means of air lifts, which not only supply the necessary power to lift a column of mixed sewage and activated sludge, but also, in so lifting the mixture, break it up, bring the activated aerobic sludge into intimate contact with the sewage, and supply at the same time air in violent agitation to further activate the sludge and to cause the bacteria therein to attack the sewage.

In these manners of treatment the air lifts may be used to raise the activated sludge, or the raw or partly treated sewage mixed with activated sludge, substantially above the surface of the receptacle containing the same and to release the liquid above said surface.

In using these air lifts the liquid after being raised to a level substantially above the surface of the chamber over which the distributor head of the air lift is intended to discharge the liquid may be caused to flow down again from its raised level in thin films and/or over roughened or riffled surfaces, preferably inclined to cause the film to be broken or agitated in flowing back. The raised matter or liquid may be caused to flow down over gratings, grids, perforated plates, screens, gauze or the like, which, whilst allowing the liquid to ripple down, also permits the greater part or the whole of the liquid to fall through thereby to come into still more intimate contact with the air in falling. Preferably the raised matter or liquid is showered, or sprayed down, or caused to fall as drops from a distributing head and in falling through the air is further activated or aerated. When showered down upon a liquid surface the falling drops break up the said surface to assist in further aeration of the liquid at the surface. According to the preferred method of treatment according to this invention the distributor head is adapted to cause the liquid column which is raised to be distributed outwards preferably in a spiral manner around the air lift, and for this purpose the said distributor head may be provided with vanes or deflectors, preferably with spiral vanes or deflectors, so as to assist in breaking up and distributing the liquid. According to this manner of treatment, the liquid delivered by the deflector head may be made to flow outwards over a coned or curved diverging surface, with or without vanes, deflectors or the like on said surface to break up and scatter the liquid. The discharge of the matter or liquid may be under better control if the same is discharged between an upper and a lower coned or diverging surface of a deflector head, with or without vanes or deflectors between these surfaces, to distribute the matter or liquid outwards under suitable guidance.

According to this invention the air lifts used may be placed in chambers with sloping, or coned, or inverted pyramid-like bottom portions, the inner surfaces of the sides of said chambers above said bottom portions being curved or concave to facilitate the circulation and aeration.

The invention thus comprises broadly the use of air lifts for circulating and aerating the liquid or sludge.

It comprises not only the methods of treatment but also a plant for the treatment of sewage, or sewage effluents, suitable trade wastes or the like, comprising one or more chambers into which the raw or partly treated sewage is introduced together with activated aerobic sludge, and in which chamber or chambers the liquid to be treated with said activated sludge is circulated by an air lift, and raised by the same air lift to above the liquid surface and caused to flow or shower back upon the surface, being aerated in the process, excess liquid being drawn off to pass, if so desired, to be treated in turn in one or more similar chambers to be operated upon in each by further air lifts, and the treated liquid then being caused to flow into a sludge settling chamber in which the sludge is caused to settle and from the surface of which the clear effluent is drawn, the sludge from said settling chamber being pumped or otherwise transferred, for example by an air lift, to a sludge chamber, in which sludge chamber sludge may be kept alive or be rapidly reactivated or revivified by means of an air lift for circulating, aerating and activating the same, and from which sludge chamber reactivated aerobic sludge may be fed back to the first chamber to enter the same with the crude or partly treated sewage fed thereto. In this plant the chambers may have sloping inverted coned shaped, inverted pyramid shape or sloping bottom portions, and the excess liquid from any one chamber may be caused to flow over into the next chamber through a pipe drawing liquid from well below the surface preferably from well towards the bottom of the chamber.

Alternatively according to this invention, the plant used may comprise a chamber into which the raw or partly treated sewage is introduced and in which it mixes with an aerobic activated sludge, said chamber having a sloping hopper-shaped, coned or inverted pyramid-like shape bottom, so that the heavier constituents will tend to settle in a desired position or in desired positions, the circulation and treatment of the contents being by the medium of an air lift adapted to raise the liquid contents to above the surface of the chamber to flow or shower down on the surface thereof to be aerated and activated in the process, baffles or screens or the like being provided in the upper portion of the chamber, away from the zone of disturbance caused by the action of the air lift, which provide quiescent zones through which the treated liquid, substantially free from sludge and solids may quietly flow to be drawn off as a clear effluent, an inlet for the sewage or the like being provided in the upper part of the disturbed zone around the air lift and an exit for the settled sludge through a valve controlled passage at or through a tube controlled by a lift or pump opening at or adjacent to the bottom of the chamber.

The invention includes a plant of the above nature for the treating of sewage or the like by the aerobic activated sludge process using an air lift for the circulation and aeration, in which the chamber or chambers used have coned, pyramid-like, hopper like or sloping bottom portions and in which the sides above said bottom portions are, on their inner surfaces, concave. The inner surfaces of the chamber may be gradually curved, the sides being hollow or concave and merging into the sloping bottom portions without sharp corners, in order to facilitate the flow of the liquid and to assist in a better aeration and more rapid treatment when the air lift is being worked.

The invention finally includes, in or for a plant for treating of sewage or the like by the activated sludge process, an air lift for use in circulating and aerating the activated sludge or sewage mixed with aerobic sludge, comprising an uplift tube for raising the liquid, an air pipe or pipes for discharging air in the bottom of the up-lift tube, and a distributing head adapted to be above the surface of the liquid to be treated, said distributing head being adapted to cause the raised liquid to be distributed outwards to flow with disturbance, or to shower or spray back upon the surface below, thus to be further aerated in the process. The said air lift may have a distributor head provided with vanes or the like for the purpose of deflecting the liquid outwards. The said distributor head may be fitted with inclined surfaces which are riffled, serrated or provided with vanes or baffles to disturb and break up the flow of liquid there-over to bring the liquid into better contact with air in flowing thereover. Alternatively, or in addition, the distributing surfaces on the distributor head may be perforated, or be grid-like, or of gauze, or of screen-like material adapted to permit part at least of the liquid flowing thereover to pass through as jets or drops to shower down on the liquid surface below. The said air-lift may have a conical surface or surfaces in the distributor head, with or without spiral or other vanes on or between the conical surfaces, over which or between which the liquid is discharged outwards to shower down from the periphery of the distributor head upon the liquid surface below.

The invention will now be described with reference to the accompanying drawings which show, by way of example only, certain forms the plant and apparatus may take.

Figs. 1 and 2 are a section and plan of a form the plant may take using four chambers.

Figs. 3 and 4 are a section and plan of a plant in which only one chamber is used.

Fig. 5 is a view of a form the distributor head may take.

Figs. 6 and 7 are plans of the upper and lower plates of this distributor, and

Figs. 8 and 9 are sections through two other forms of distributor heads.

Referring first to Figs. 1 and 2. Four chambers A, B, C and D are shown, although the plant is not limited to this number.

Into the first chamber A the raw or partly treated sewage, for example the effluent or discharge from a septic tank, is introduced through the pipe 1. This sewage mixes with activated aerobic sludge which is introduced at 2 in close proximity to the point of introduction of the sewage. The sewage and sludge pass down the chamber A and are kept in active circulation by the air lift 4. The bottom 3 of the chamber is sloped or made hopper shaped. In the particular plant shown since the chamber is shown as square in cross section the bottom 3 will be like an inverted pyramid. The air lift 4 raises the mixed sewage and sludge from the bottom of the chamber A and discharges it from the distributor head 5 to shower back upon the surface of the liquid in A.

The air lift may be of any convenient form. It may be a simple tube, say four inches or so in diameter, with an air supply tube 6 of smaller diameter passing down its centre, said air tube discharging the air through a multiplicity of small holes into the bottom of the uptake tube 4. If preferred the air lift may have outside air tubes and any known or convenient form of air discharge at or adjacent to the lower end of the uptake tube. In any case the mixed sewage and activated sludge is drawn up by the air lift. In the uptake tube the sewage and sludge are brought into intimate contact in turbulent mixture with the air and a very rapid and efficient interaction takes place, the sludge being further activated by the air and the bacteria attacking the sewage constituents. A very rapid aeration and oxidation takes place in the up take.

On being discharged from the distributor head 5 further aeration and oxidation takes place as the mixed sewage and sludge showers back, as indicated at 8, onto the surface of the liquid in chamber A.

The distributor head 5 for this purpose is raised well above the surface 16 of the liquid in order that the air may act upon the same as it falls as a shower preferably in individual drops. Still further aeration and oxidation takes place owing to this shower falling on the surface of the liquid and breaking up and disturbing the surface.

Air is supplied through the air main 7. A very efficient circulation of the liquid takes place as it is raised from the bottom of the chamber by the air lift, showered down on the surface and flows to the bottom again.

Liquid, partly or completely treated, with a certain amount of sludge is continuously flowing away through the exit pipe 9. This exit pipe extends well down into the chamber A, and draws liquid through the lower end 9a. The over-flow of course depends on the rate of supply of sewage and sludge through 1 and 2. The overflow passes through the exit pipe 10 into the next chamber B.

In chamber B the process is repeated and a more perfect aeration and aerobic treatment ensured.

From chamber B the treated sewage and sludge pass into chamber C. In the plant illustrated chamber C is a settling chamber, hence the discharge from B passes through pipe 10c into a larger diameter pipe 11 so that its velocity is reduced before it enters chamber C. In this chamber C the sludge settles to the bottom at 12 whilst the clear effluent fills the upper part 13 and is allowed to flow away through 14.

From time to time the air lift 4c is worked to remove part of the settled sludge which falls to the lower part 12 of the chamber. This air lift 4c has no distributor head and the raised sludge is delivered by means of pipe 15 and down pipe 16 into the sludge chamber D. If there is more sludge than is necessary part of the sludge may be diverted and be dried to be used as a manure. In any case the surface 17 of the sludge tank D is above the surface 18 of the liquid in the tanks A, B and C, so that the sludge may flow off by the outlet 19 at this surface to flow back into chamber A at inlet 2. In sludge chamber D an air lift 4d with a distributor head 5d is provided. This is for the purpose of reactivating the sludge. It has been found that using an air lift, of the type to be more particularly described later, it is possible to activate and revivify an aerobic sludge by working the air lift for a few minutes.

The action then is as follows:—After the plant has been shut down for the night the air lift 4d is started and the sludge in sludge chamber D is rendered extremely active in a very short time. The said reactivated sludge is then allowed to flow from exit 19 into chamber A and at the same time the air lift in chamber A is started. Sewage is then allowed to enter through pipe 1 and in a few minutes thereafter the whole plant is in active operation.

In Figs. 3 and 4 another plant is illustrated of a more simple nature in which the whole operation is carried out in a single chamber E.

In this plant the sewage, either raw or partly treated by some other or previous process, is introduced through inlet pipe 1e. The chamber E is already filled partially with sewage undergoing treatment and with sludge. On working the air lift 4c the sludge is rapidly activated and a very rapid and efficient treatment of the sewage at once starts. Sludge collects at the bottom 3e of the chamber E and the treated effluent flows away through a quiescent zone 25 to the effluent discharge 14e. This quiescent zone 25 is produced by the introduction of the baffle wall 20 which divides the said zone 25 from the area around the distributor head 5e, where the sewage is being introduced and where the surface is being turbulently disturbed by the shower from the said distributor.

It will be noted that in this case the chamber is shown as being circular in plan.

The sludge, when much of it collects, may be drawn off from time to time through the discharge conduct 26 which is controlled by the valve 27. If preferred the excess sludge might be removed by any suitable pipe extending to the bottom of chamber E and provided with some pumping means to lift or remove the sludge.

In Fig. 3 a modification is indicated which has proved of considerable importance. The inner surface 21 of the side walls, instead of being vertical as in chambers A to D, is made concave as indicated. The curve of this inner surface at its top 22 joins or continues the inner surface of the baffle 20 so that there is no abrupt change in general direction and the lower edge 23 of this concave side wall merges into the conical bottom part 3e of the chamber.

The effect of this curvature is very beneficial to the treatment of sewage by the air lift. Perhaps the improvement is due to the better flow coefficient in such a chamber and actually depends on the improved circulation.

It will of course be realized that the upper wall 24 of the chamber behind the baffle 20 need not necessarily be set back as shown, the space 25 forming the quiescent zone might merely be in the shape of pockets or subsidiary chambers or channels of sufficient area to ensure a very slow movement of liquid upwards there-through, and thus to ensure that the sludge and solid particles of sewage shall not be carried up to the effluent discharge 14c.

A form the distributor head may take is illustrated in Figs. 5, 6 and 7. In this the up-take pipe 4 surrounds the air discharge pipe 6 (this however is not essential) and the up-take terminates in a flange or plate 28. A second plate 29 is bolted to plate 28 with the bolts 30. This second plate 29 has fixed thereto the vanes 31, 31, which vanes act as spacers between the plates 28 and 29 and also break up and distribute the liquid discharged by the up-take pipe 4 in an outward direction. The vanes 31, 31 preferably are of a spiral nature so as to throw the liquid outwards somewhat tangentially as by such action a better outward distribution and a better breaking up of the liquid into a shower is aimed at. The vanes 31, 31, might be fixed to plate 28 instead of the plate 29 and the details altered considerably.

In Fig. 8 another form of distributor head is shown which has some advantages over the previous form. In this case the plates 28 and 29 have substituted therefor the coned surfaces 32 and 33. These coned surfaces 32 and 33 are provided with vanes 34 therebetween and are bolted, with bolts 35, together. Preferably the vanes 34 are of spiral formation. In this instance the liquid rising to the top of the up-take column 4 is distributed outward with a less abrupt change of direction within the distributor head and hence there is less frictional loss. The circulation is better, the power consumption will be less and the liquid may be scattered outwards over a greater area.

In Fig. 9 a modification of the distributor head is indicated. In this the coned surfaces of Fig. 8 are rounded off more to make the change of direction more gradual as indicated by the easier curves given to the upper and lower sides 37 and 36. Vanes, baffles or parting plates 38 are introduced as before between the surfaces 37 and 36. The lower surface 36 curves outwards and downwards at 39 so as to catch the lower parts of the outward flow.

This surface 39 is serrated or riffled at 40 on its upper surface so that the flow of liquid running down said surface is broken up and agitated and brought into more intimate contact with the air. The riffles, serrations or baffles 40 may be spiralled or staggered on the surface 39 to further break up and disturb the flow. The surface 39 may further be perforated at 41 or have a grid-like texture so that part of the flow will pass through and fall as a shower onto the liquid surface beneath.

This surface 39 may indeed be of a gauze or screen like material of sufficiently open texture to allow the liquid to shower through and the roughness of the upper surface may be sufficient to break up and disturb the film or sheet of liquid flowing thereover sufficiently to cause it to be aerated better. Such open gauze or screen like surface might be rippled or waved in cross section to form obstructions to the flow and thereby to encourage a reasonable proportion of the liquid to pass through so that by the time the liquid flowing down the surface 39 reaches its lower edge 41 the greater part, if not the whole of the said liquid, would have passed through and fallen as a shower upon the liquid surface 18 below.

The surface 39 should be raised some distance above the liquid surface 18 so that the air may have free access owing to the fact that when falling as drops through the air the aeration and oxidation is very efficient and within limits, dictated by the amount of power available for working the air lifts, this distance should be a substantial one.

When the air lift is working very vigorously with plenty of compressed air at suitable pressure available the liquid discharged by the distributor head may fly clear of the surface 39, but when less air is available a good deal of the liquid raised might fall as a comparatively straight falling sheet of liquid from the periphery of the surface 36 if no further surface such as 39 were provided. It is effectively to deal with the liquid when the air pressure for the air lift is not as good as it might be that the surface 39 would be of advantage owing to its capacity for spreading out and showering the liquid flowing thereover over a wider area below.

It will be realized that the invention is not limited to the apparatus shown. The chambers may be of any size or shape and any convenient number may be employed. Any convenient means for removing surplus aerobic sludge from the bottom, or from near the bottom, of any chamber in which it may have collected, for example by gravity, air lift or pump, may be employed.

The chamber D for reaerating the sludge is not essential in the plant first described as in certain cases, depending on the strength of the sewage, the conditions of working, etc. the settled sludge may be taken direct from chamber C to chamber A.

Any type of air lift may be used and these may be fitted with any convenient type of foot piece.

Having now particularly described and ascertained the nature of our said invention and in what manner the same is to be performed, we declare that what we claim is:—

1. An apparatus for treating activated sludge or sewage consisting in a sludge-receiving chamber, a column in said chamber terminating above the surface of the sludge in the chamber, a pipe for delivering air under pressure to the bottom of the chamber to force the sludge upwardly through said column, and means at the upper end of the column for directing the sludge upwardly and outwardly whereby to project the sludge freely into the atmosphere on a rising plane materially above the surface of the sludge in the chamber.

2. In an apparatus for treating activated sludge or sewage, a receiving chamber, a column extending vertically of the chamber and communicating with the latter near the lower end thereof, means for delivering air under pressure to the bottom of the chamber for forcing a column of sewage longitudinally of the column, the upper end of the column being arranged materially above the surface of the sewage in the chamber, the upper end of the column being formed with an annular, upwardly and outwardly inclined discharge passage for correspondingly directing the discharge of the sewage from the column.

3. In an apparatus for treating activated sludge or sewage, a receiving chamber, a column extending vertically of the chamber and communicating with the latter near the lower end thereof, means for delivering air under pressure to the bottom of the chamber for forcing a column of sewage longitudinally of the column, the upper end of the column being arranged materially above the surface of the sewage in the chamber, the upper end of the column being formed with an annular, upwardly and outwardly inclined discharge passage for correspondingly directing the discharge of the sewage from the column, said passage having curved interior baffles.

4. In an apparatus for treating activated sludge or sewage, a receiving chamber, a column extending vertically of the chamber and communicating with the latter near the lower end thereof, means for delivering air under pressure to the bottom of the chamber for forcing a column of sewage longitudinally of the column, the upper end of the column being arranged materially above the surface of the sewage in the chamber, the upper end of the column being formed with an annular, upwardly and outwardly inclined discharge passage for correspondingly directing the discharge of the sewage from the column, said passage terminating in an outwardly and downwardly inclined deflecting plate.

5. In an apparatus for treating activated sludge or sewage, a receiving chamber, a column extending vertically of the chamber and communicating with the latter near the lower end thereof, means for delivering air under pressure to the bottom of the chamber for forcing a column of sewage longitudinally of the column, the upper end of the column being arranged materially above the surface of the sewage in the chamber, the upper end of the column being formed with an annular, upwardly and outwardly inclined discharge passage for correspondingly directing the discharge of the sewage from the column, said passage terminating in an outwardly and downwardly inclined deflecting plate formed with perforations and provided with baffles.

In testimony whereof we hereto affix our signatures, this 16th day of August, 1928.

JOHN COLLINS DALLAS.
MALCOLM WILSON.